United States Patent [19]

Konagai

[11] Patent Number: 5,207,553
[45] Date of Patent: May 4, 1993

[54] SUCTION LIFTING DEVICE FOR FLAT WORKPIECES

[76] Inventor: Haruo Konagai, 19-3, Akiyama-cho, Shizuoka-shi, Shizuoka 420, Japan

[21] Appl. No.: 841,983

[22] Filed: Feb. 26, 1992

[51] Int. Cl.⁵ ............................................. B25J 15/06
[52] U.S. Cl. ................................... 414/737; 294/65; 414/752; 901/40
[58] Field of Search ................... 414/737, 752, 744.8; 901/40; 294/65.1, 64

[56] References Cited

U.S. PATENT DOCUMENTS 2,960,364  11/1960  Herzog ................................. 294/65
4,674,785  6/1987  Riesenberg .......................... 294/65

FOREIGN PATENT DOCUMENTS 60-63984   4/1985  Japan .
60-259447  12/1985  Japan .
63-144049  6/1988  Japan .

*Primary Examiner*—Michael S. Huppert
*Assistant Examiner*—Donald W. Underwood
*Attorney, Agent, or Firm*—Morrison Law Firm

[57] ABSTRACT

A suction lifting head for use in the lifting and transport of generally flat workpieces is designed to conform to its use with workpieces varying in size and produce activation of such suction ports therein as necessary to perform the lifting of the workpiece. The lifting head is constructed with a body having an outer suction port(s) at a surface of the body, a valve chamber(s) connected to the outer suction port and intervening an inner suction port which in turn is in communication with a vacuum main connection at a side of the body remote from the surface having the outer suction port(s). A valve disk with multiple holes for air flow is located inside the valve chamber. These holes are located in the valve disk to be positioned radially beyond the circumference of the outer suction port and such that circumferential portions of the valve disk will be supported on a stepped section in the valve chamber when a workpiece is lifted against the outer suction port. In such condition, holding influence of the vacuum is sustained because a communication path from the outer suction port to the inner suction port includes the holes in the valve disk which have at least portions extending radially inwardly of the valve chamber stepped section support structure.

11 Claims, 5 Drawing Sheets

SUCTION LIFTING DEVICE FOR FLAT WORKPIECES

BACKGROUND OF THE INVENTION

The present invention relates to lifting devices and more particularly suction lifting devices for lifting and handling flat articles such as sheet lumber, glass sheet and the like.

Vacuum suction lifting devices. e.g., a vacuum chuck for lifting and handling sheets of steel, glass, resin, lumber, wall and roofing panels etc, operate by application of negative air pressure or vacuum to a sheet to pick up and transfer it thereby avoiding need to use mechanical components contacting the sheet that could impose harmful force on the sheet resulting in flawing or damaging the sheet and especially surfaces thereof.

Such vacuum devices are usually part of a larger system which includes components for identifying sizes and forms of the work pieces to be handled by means of sensors, or in some more advanced systems, using an image information processor. After recognizing the size and form of the work, the system then actuates vacuum cups, connecting pneumatic lines as well as other devices for handling the work pieces, this commonly being done with solenoid valves or other controlling devices embodied in the system. Vacuum pumps and vacuum ported devices also are necessary parts of the system. Known systems and lifters as used therewith have certain drawbacks and/or are unnecessarily complicated.

A known system such as an industrial robot disclosed in Japan Patent Bulletin 2-88193 comes with a blower under the vacuum cup so as to prevent a flexible and thin film workpiece, such as a sheet of paper, from falling from a transport arm holding the work at the vacuum cup. The blower is used to support the transport cycle of the arm by applying positive air pressure against the sheet supplementing the vacuum holding effect.

A suction cup device disclosed in Japan Patent Bulletin 2-29215 is equipped with a sliding shaft as a base which is free rotating. A suction cup is fixed at a protruding edge of the sliding shaft. A pneumatic passage can be formed inside the shaft to communicate with an activating port at the protruding edge. The structure and operation of this device is very complicated.

A piler system (loading/unloading system) disclosed in Japan Patent Bulletin 2-300014 is operated by input data, such as length and form of the workpiece, fed into a control system. The control after receiving these data selects appropriate suction cups enough to accomplish the job. During this step, a workpiece is held at a sensing position until the control system determines to where the workpiece should be transported to be processed at the next stage, which is in this instance, a loading position. This system also is very complicated.

A station system disclosed in Japan Patent Bulletin 2-305716 is for the sheet lumber industry. A size sensor in the system detects sizes of lumber sheet. After the control system is fed with size data, it selects and activates necessary suction cups required to handle the particular sheet lumber. The main mechanism for performing this operation comprises switch valves and a pneumatic power line network. The operating cycle is controlled by commands from the control system. Selected suction cups are then activated to pick up the work. This system is very complicated.

Less complicated and inexpensive, reliable system components such as the suction lifting device itself, thus represent a desirable need in connection with suction lifting of articles.

OBJECTS AND SUMMARY OF THE INVENTION

Accordingly, an object of the invention is to provide a vacuum suction lifting device for lifting and holding sheet type workpieces that overcomes the drawbacks of the prior art.

Another object is to provide a vacuum suction lifting device reasonable of cost, easily maintained and which does not require sensor or image processing system in connection with workpiece size recognition as a preliminary to using the device.

A further object is to provide a vacuum suction lifting device which reduces energy consumption incident its use in that it can be operated with a smaller vacuum pump than prior systems and devices used for the same purpose, and with less noise creation contributing to improved work space environment.

A yet further object is to provide a vacuum suction lifting device that is easily incorporated for use in a process robot line without requiring an additional tasking command to the robot control system in that its construction allows continuous use without need for relearn procedure.

A still further object is to provide a vacuum suction lifting device that is of simplified construction minimizing the number of parts used as compared to prior devices, this advantage contributing to easy manufacturing requirements as well.

Briefly stated, there is provided a suction lifting head for use in the lifting and transport of generally flat workpieces designed to conform with use with workpieces varying in size and to activate suction ports therein as necessary to perform the lifting of the workpiece. The lifting head is constructed with a body having an outer suction port(s) at a surface of the body, a valve chamber(s) connected to the outer suction port and intervening an inner suction port which in turn is in communication with a vacuum main connection at a side of the body remote from the outer suction port(s). A valve disk with multiple holes for air flow is located inside the valve chamber with these holes located in the valve disk to be positioned radially beyond the circumference of the outer suction port and such that circumferential portions of the valve disk will be supported on a stepped selection in the valve chamber when a workpiece is lifted against the outer suction port. In such condition, holding influence of the vacuum is sustained because a communication path from the outer suction port to the inner suction port includes the holes in the valve disk which have at least portions extending radially inwardly of the valve chamber stepped section support structure.

In accordance with these and other objects of the invention, there is provided a device for suction lifting and holding flat workpieces, the device comprising a body defining a lifting head having a suction face including at least one outer suction port at the suction face with the head further having at least one inner suction port and a valve chamber intervening the said at least one inner and outer suction ports and being communicatively connected with each, the valve chamber also including a valve seat proximal the at least one inner suction port. A port also is provided at a body part remote from the lifting face for connecting the lifting head with a source of vacuum, this connecting port being in communication with the said at least one inner suction port for establishing vacuum condition at the one inner suction port. A valve disk is in the valve chamber and has multiple through holes therein at a circumferential region thereof, with the valve disk sized such and the through holes such positioned therein as to lie outside a circumferential expanse of the at least one outer suction port. The valve disk is drawn against the valve seat by a differential of pressure represented by the vacuum condition at the at least one inner port present at one valve disk face, and a communication of said at least one outer suction port with ambient atmosphere present at an opposite valve disk face. The valve chamber also has stepped structure therein proximal the at least one outer suction port and the valve disk moves to a position wherein its circumferential region is supported on this stepped structure with at least portions of the through holes unobstructed by such stepped structure whenever a workpiece is in contact with the lifting face and covers the at least one outer suction port. This excludes communication of the outer suction port with the ambient atmosphere so that the condition of vacuum present at the said one valve disk face is communicated to the opposite valve disk face by way of the disk hole unobstructed portions so that with the said at least one outer suction port covered, the workpiece holding condition of vacuum is sustained at the said at least one outer suction port.

In another aspect, the invention provides a device for suction lifting and holding flat workpieces, which device is comprised of plural bodies with each body defining a lifting head. Each lifting head has a suction face and the suction head includes at least one outer suction port at the suction face. Each said lifting head further has at least one inner suction port and a valve chamber intervening the inner and outer suction ports and is communicatively connected therewith. The valve chamber includes a valve seat proximal the one inner suction port. A port is provided in each body at a body part remote from tis suction face for connecting the lifting head with a source of vacuum, and this connecting port is in communication with said at least one inner suction port for establishing vacuum condition at the one inner suction port. A valve disk in provided in the valve chamber, and has multiple through holes therein at a circumferential region thereof, with the valve disk being sized such and the through holes such positioned therein, as to lie outside a circumferential expanse of the one outer suction port. The valve disk is drawn against the valve seat by a differential of pressure represented by the vacuum condition at the one inner port present at one valve disk face, and a communication of said at least one outer suction port with ambient atmosphere present at an opposite valve disk face. The valve chamber also has stepped structure therein proximal said at least one outer suction port, and the valve disk moves to a position wherein its circumferential region is supported on the stepped structure with at least portions of the through holes unobstructed by such stepped structure whenever a workpiece is in contact with the suction face and covers said at least one outer suction port to exclude communication thereof with ambient atmosphere. With the outer suction port covered, the condition of vacuum present at the one valve disk face communicates to the opposite valve disk face by way of the disk hole unobstructed portions so that with the at least one outer suction port covered, workpiece holding condition of vacuum is sustained at the one outer suction port. Each of the lifting heads is fixed to a carrier, and means are provided for moving the carrier in three-dimensional movement paths during workpiece lifting and holding operations.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The suction lifting and holding device of the invention is suited for use in handling operations involving the lifting and transport of generally flat configured sheet material of a wide range of description, and is therefore amenable to many industrial and commercial applications. Of particular advantage with regard to the device is its independence of any complicated sensors and like identification means as heretofore used when handling sheet material workpieces having a range of geometries and sizes. The device of the invention is designed to use as many or as few of suction lifting ports in contact with a workpiece as are needed to do the job. This capacity to deal with random and different sized workpieces without requiring adjustments to the device in between a lift and or transport task is an important advantage of the device.

Figure 1:
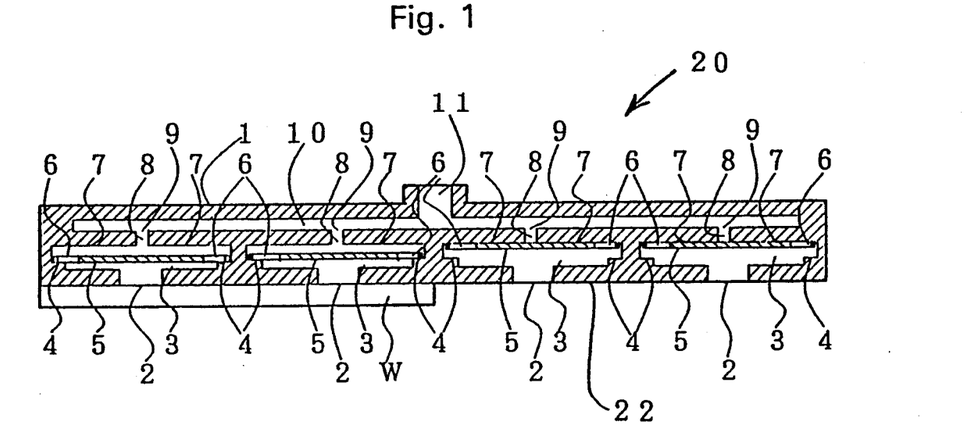
FIG. 1 is a vertical sectional view of a suction lifting head constructed in accordance with the principles of the invention, a workpiece being shown in held or lifted position against the suction face at the left side of the head.
Figure 2:
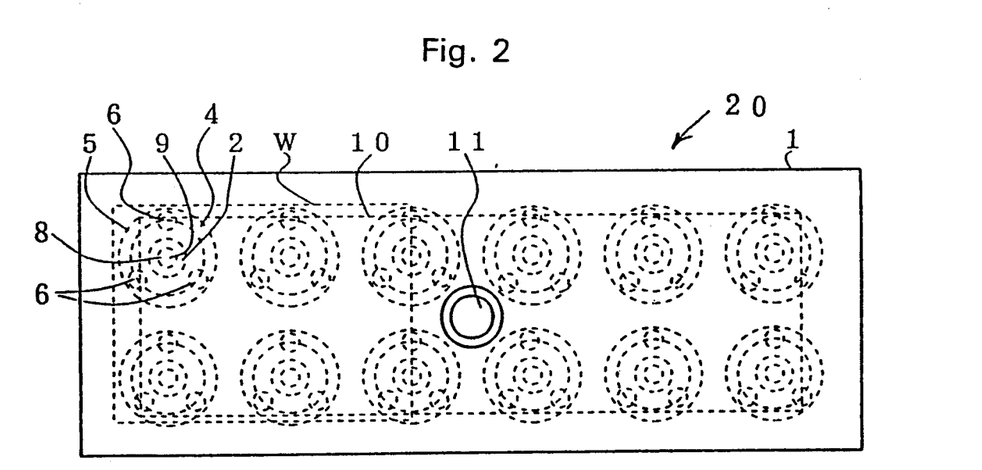
FIG. 2 is a top plan view of the suction lifting head shown in FIG. 1 and illustrating one manner of arraying the suction ports therein.

Referring to the drawings, FIG. 1 depicts an embodiment 20 of vacuum suction lifting device which comprises a body 1 which can be of the elongated, widened expanse as best seen in FIG. 2. Body 1 defines a lifting head which has a suction face as at its lower surface 22, and a plurality of outer suction ports 2 are formed in that face, these ports communicatively opening into the lower part of associated valve chambers 3 formed in the body. Upper parts of the valve chambers are in turn, in communicative connection with inner suction ports 9 constitute a flow course 8 to a vacuum chamber or manifold 10 formed in the body.

Each valve chamber 3 has a valve seat 7 in which the inner suction ports are centered and against which a valve disk 5 can be drawn to block off the associated inner suction at times whenever the manifold 10 is under influence of vacuum and the associated outer suction port is exposed to normal atmosphere pressure and as will be described below in more detail when description of the manner of operation of the lifting head is detailed.

Valve chambers 3 which diameterwise are larger than both the inner suction ports 9 and the outer suction ports 2, have generally circular cross-section, and the associated outer ports 2 can be of like section, advantageously concentrically disposed relative to the valve chamber, but of lesser circumferential expanse than the valve chamber. The valve chambers have stepped sections 4 therein configured as annular support surfaces on which the valve disks 5 can be supported at times when the outer suction port 2 is closed off by covering presence of a lifted workpiece W drawn thereagainst as shown, e.g., at the left side of the face 22 in FIG. 1.

Valve disks 5 each have a plurality of through openings 6 therein, these being best seen in FIGS. 9-12. By reason of the valve disk diameter being greater than that of the ports 2 and 9, the openings 6 are positioned radially beyond these ports. With the valve disks 5 seated on stepped sections 4 and by reason of the radial width of the stepped section being less than the diameter of the openings 6 which are located or positioned at circumferential regions of the disks, there will always be in such situation at least portions of the openings 6 which are unobstructed by the stepped section. Thus, whenever the disks are on the stepped sections, a flow course path exists between the inner and outer suction ports by way of the unobstructed portions of the openings 6.

Figure 6:
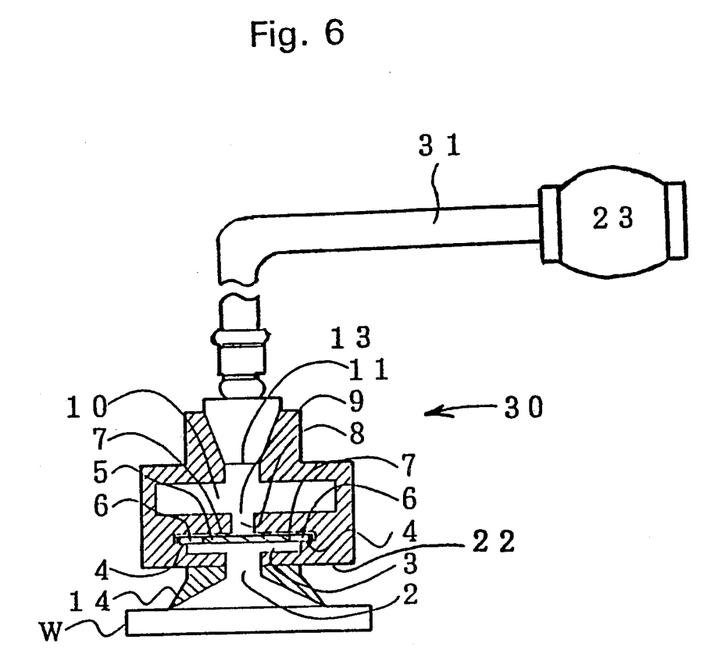

Body 1 includes at a part thereof remote from the suction face 22, a main vacuum port connection 11 by means of which the body can be connected to a source of vacuum, e.g., a vacuum pump such as that depicted at 23 in FIG. 6. Vacuum connection port 11 communicates directly to vacuum manifold 10 so that the vacuum produced with the vacuum pump is always present at inner suction ports 9 and present at outer suction ports 2 whenever same are covered by a workpiece in the course of a lifting.

In use the lifting head will be moved into contact with workpiece W as shown in FIG. 1. This will result in the two outer suction ports 2 at the left side of the head being covered blocking communication of these ports with atmospheric air and its absolute pressure of 15 psi. With the outer ports 2 blocked, the valve disks 5 in the associated valve chambers 3 (previously drawn up against valve seats 7 by the absolute pressure difference between the vacuum effect, e.g., 1 or 2 psia, at inner ports 9, and the atmospheric pressure at the lifting face), will drop to support on the stepped sections 4. With the valve disks in that position, the pressure at the opposite faces of the valve disk will equalize to the condition of vacuum at the inner suction ports 9 because openings 6 provide the flow course for such to exist, this condition being at the suction face, produces the absolute pressure differential that holds the workpiece against the lifting face and it can then be picked up and moved as required by moving the lifting head accordingly.

The lifting head of the invention has an important advantage in that it is adaptable to the pickup and holding of workpieces without reliance on any workpiece sensing or size identifying components. The lifting head adjusts to the need of given lifting requirement in respect of the size of the workpiece involved. This is seen with reference to FIG. 2 from which it is noted that the plurality of outer suction ports 2 provided at the device lifting face are arrayed in longitudinally disposed plural rows of such ports. The ports in a given row can be aligned with the others as shown, or other or additional patterns of port arraying such as alternate positioning in one row relative to an adjacent row etc could be used as well. Other useful patterns of row array are possible given special workpiece shapes.

This illustrated arrangement shows how workpiece W of given length and width when the lifting head is lowered into contact therewith, is covered in such way that all or a part of six of the outer suction ports will be covered by the workpiece. Only the leftmost four of these ports are fully blocked in this instance but these four allow sufficient suction lift effect to be applied to the workpiece to securely hold it to the lifting face 22. One pair of suction ports 2, i.e., the third pair from the left are only partly covered by the workpiece so that the valve disks associated with these will remain drawn against seats 7, these ports thus not cooperating in the lift. None of the ports to the right of this third pair are used in this lift either.

It also will be understood from FIG. 2 how the lifting head adapts to other sized workpieces. For example, a workpiece about double the length of that shown and of half again width would cover the left five pairs of outer suction ports which would be involved in the lift, while the rightmost pair would not, the valve disks in these being drawn against their valve seats. The lifting head has plural outer suction ports to adapt it to lifting of a range of sizes of workpieces, but only so many of such as are required or advantageous to use will be involved in the lifting. The others do nothing as their communication to the vacuum manifold remains blocked. This means of course that no waste of vacuum effect is involved with these unused outer suction ports with attendant lesser demand or loading imposition being placed on the vacuum pump. Smaller suction loading also means smaller, more economical vacuum pumps can be used than heretofore.

Figure 3:
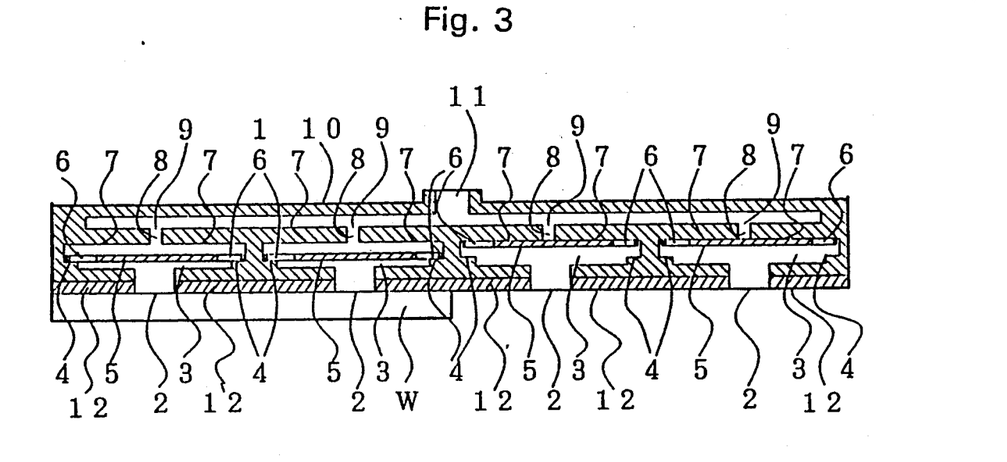
FIG. 3 is a vertical sectional view of the suction lifting head fitted at the suction face thereof with flexible padding material to provide protective contact with a workpiece to insure avoidance of any damage or marring of the workpiece, the depicted workpiece being, e.g., a P.C. board requiring lifting and movement in an electronics industry assembly line.

Workpiece lifting with the lifting head of the invention will involve working with generally flat workpieces so that covering of the outer suction ports therewith in tight sealed contact should present no special difficulty. In some instances, a sheet gauge or type of material may present an irregularity at the sheet surface that would inhibit full confronting contact between the sheet surface and the encircling lifting face structure defining the outer suction ports. To counter such possibility, the lifting face can as shown in FIG. 3 have a layer or pad of flexible material 12 attached thereto, this layer having openings that register with the outer suction ports. The flexible material enhances contact conformity with the workpiece surface and thus optimizes the sealing between the lifting head and the workpiece. A soft flexible layer also is of advantage where workpiece surface marring or damaging must be prevented.

Figure 4:
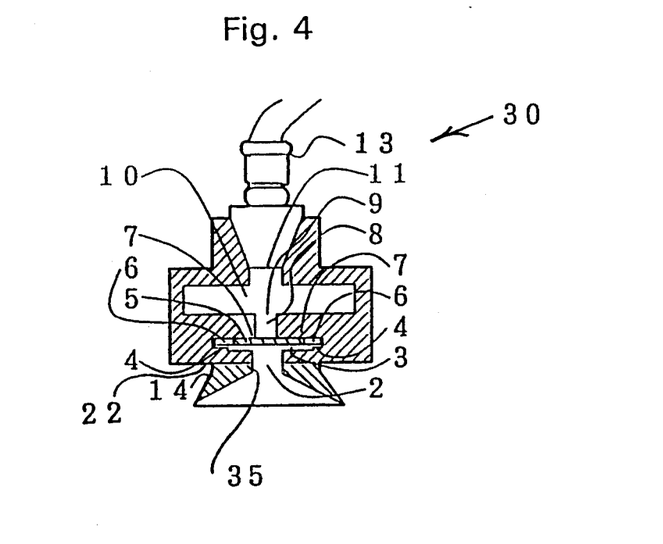
FIGS. 4-6 are vertical sectional views of another embodiment of suction lifting head designed to be mounted on a robot arm and being fitted with a suction cup at the suction face, the successive views showing the lifting head at use remote positioning, position at engagement with a workpiece, and a position to which the workpiece has been lifted with the head.
Figure 5:
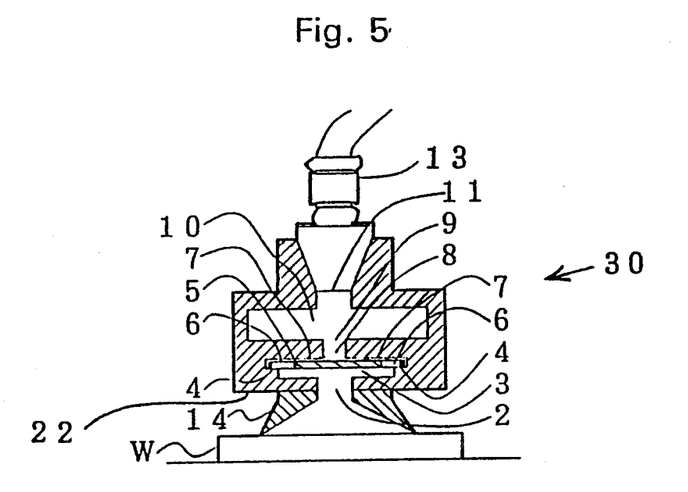

FIGS. 4-6 show another embodiment 30 of lifting head which has a differently configured body than that previously discussed. It has though the same constructional and functional features as the embodiment 20 and for that reason the same reference numerals denote the common components of each. Lifting head 30 also includes a fitting 13 at the top thereof received in the vacuum connection port 11 and which fitting by means of flexible line 31 connects the head with the vacuum pump 23 as seen in FIG. 6. Lifting head 30 also has suction cups 14 fitted to the lifting face 22 concentric with the outer suction ports and the cups having central openings as at 35 in register and communication with the outer suction ports. The suction cups can be made of somewhat rigid material or of other more flexible material in the manner of the pad 12 of the earlier described head embodiment, this being for the same reason as explained earlier FIG. 4-6 show successive steps in the use of the head. In FIG. 4, the head is seen descending to contact with a workpiece W. In FIG. 5 the contact has been made and the workpiece is held against the head. In FIG. 6 the workpiece has been raised a distance, being held securely to the head for such reason or delivery destination to which it is bound.

Figure 7:
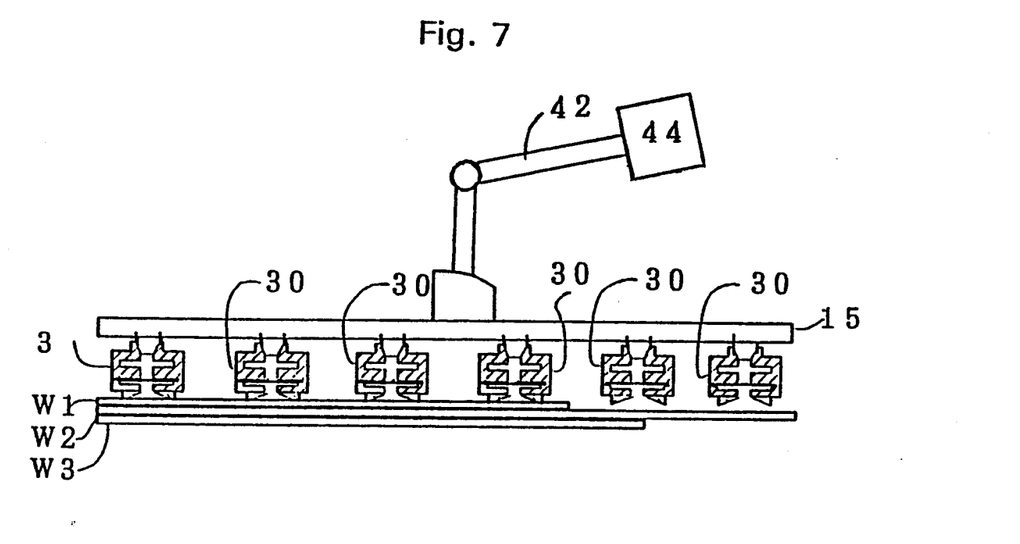
FIG. 7 is an elevational view, partly in section of a suction lifting head employed for lifting and handling sheet lumber of random lengths.

The lifting head can be employed in plural numbers of such in a given application, and these heads can be ganged together as by fixing them to a carrier 15 as shown in FIG. 7, the heads, by way of example, being the type of head 30 seen in FIGS. 4-6. The carrier also can embody the vacuum connection. Further the carrier can be fixed to an arm 42 or other structure element that is operated and controlled by a suitable unit 44 to give three-dimensional movement to the carrier and hence, to a workpiece to be lifted and/or transported therewith, these last-mentioned components being e.g., part of a robot.

Figure 8:
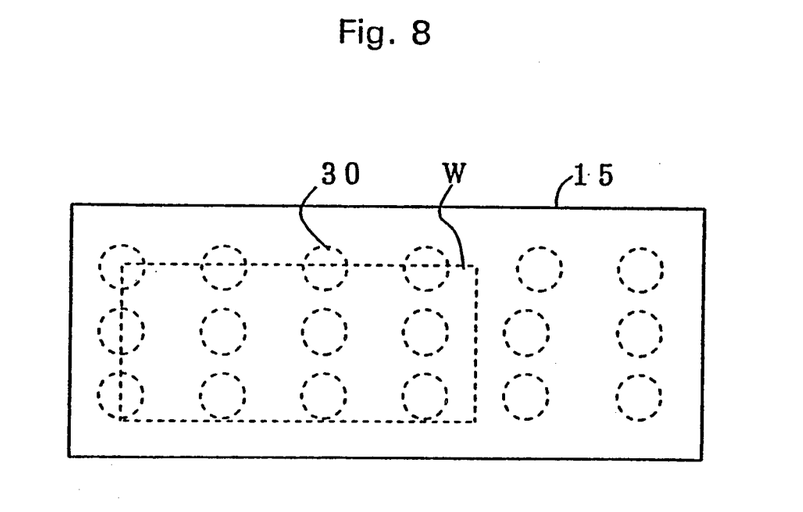
FIG. 8 is a top plan view of the FIG. 7 suction lifting head.
Figure 9:
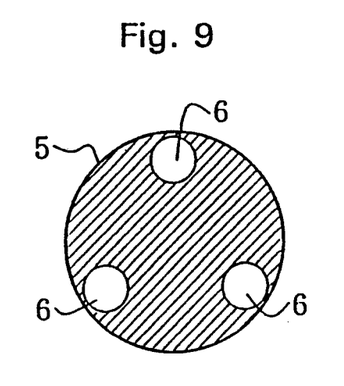
FIG. 9 is a top plan view of a disk valve with multiple holes for air flow which can be embodied in the suction lifting head of the invention.
Figure 10:
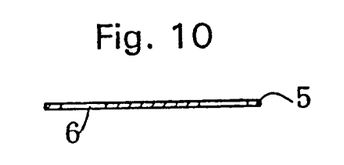
FIG. 10 is a vertical sectional view of the disk valve shown in FIG. 9.
Figure 11:
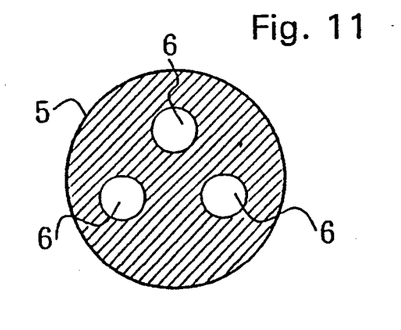
FIG. 11 is a top plan view of a disk valve having air holes arranged differently from that of FIG. 9.
Figure 12:
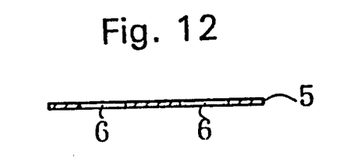
FIG. 12 is a vertical sectional view of the disk valve of FIG. 11.

FIG. 7 shows the random sizes of workpieces W1, W2 and W3 that can be handled with the device of the invention. The arraying of the lifting heads on the carrier can e.g., be as shown in FIG. 8.

FIG. 9-12 shown details of the valve disks 5 and the openings therein. It is seen that the openings are plural in number and set in circumferential region of the disks, the openings in the FIG. 9 disk being closer to the actual disk circumference than those in the FIG. 11 disk.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for suction lifting and holding flat workpieces, the device comprising
 a body defining a lifting head, the lifting head having a suction face including at least one outer suction port at said suction face, said lifting head further having
 at least one inner suction port and a valve chamber intervening said at least one inner and outer suction ports and communicatively connected therewith, the valve chamber including a valve seat proximal the at least one inner suction port,
 a port at a body part remote from said suction face for connecting the lifting head with a source of vacuum, said connecting port being in communication with said at least one inner suction port for establishing vacuum condition at said one inner suction port, and
 a valve disk in said valve chamber, said valve disk having multiple through holes therein at a circumferential region thereof, said valve disk being sized such and the through holes such positioned therein as to lie outside a circumferential expanse of said at least one outer suction port, said valve disk being drawn against said valve seat by a differential of pressure represented by the vacuum condition at said at least one inner port present at one valve disk face, and a communication of said at least one outer suction port with ambient atmosphere present at an opposite valve disk face, said valve chamber having
 stepped structure therein proximal said at least one outer suction port, said valve disk moving to a position wherein its circumferential region is supported on said stepped structure with at least portions of the through holes unobstructed by such stepped structure whenever a workpiece is in contact with the suction face and covers said at least one outer suction port to exclude communication thereof with ambient atmosphere, the condition of vacuum present at said one valve disk face communicating to the opposite valve disk face by way of the disk hole unobstructed portions so that with the said at least one outer suction port covered, workpiece holding condition of vacuum is sustained at said one outer suction port.

2. A suction lifting and holding device in accordance with claim 1, comprising a plurality of outer suction ports at the body suction face, there being an inner suction port, valve chamber and valve disk associated with each outer suction port, each inner suction port being in communication with the vacuum connecting port.

3. A suction lifting and holding device in accordance with claim 2, comprising a vacuum manifold in said body, each inner suction port being in communication with said vacuum manifold, the vacuum manifold being in communication with said vacuum connecting port.

4. A suction lifting and holding device in accordance with claim 2, in which the plurality of outer suction ports are arrayed at the body suction face in plural rows of such suction ports.

5. A suction lifting and holding device in accordance with claim 4, in which the outer suction ports in a row are substantially aligned, one with others.

6. A suction lifting and holding device in accordance with claim 2, comprising a flexible material layer covering the body suction face, the said flexible material layer having through openings therein registering with the outer suction ports.

7. A suction lifting and holding device in accordance with claim 2, comprising suction cup elements carried at the body suction face and extending outwardly and flaringly from said outer suction ports, the suction cups having through openings therein in register with said outer suction ports.

8. A suction lifting and holding device in accordance with claim 1, comprising a fitting carried on the body at the vacuum connecting port, the fitting being receptive of a means for connecting it to the source of vacuum.

9. A suction lifting and holding device in accordance with claim 8, in which the means for connecting the fitting with the source of vacuum is a flexible conduit.

10. A suction lifting and holding device according to claim 1, in which said valve chamber is of circular cross-section concentric with a circular outer suction port, the valve disk in the valve chamber having greater diameter than the outer suction port, the stepped structure in the valve chamber being of annular configuration of radial width less than a diameter of the through holes in the valve disk.

11. A device for suction lifting and holding flat workpieces, the device comprising plural bodies each defining a lifting head, each lifting head having a suction face including at least one outer suction port at said suction face, each said lifting head further having at least one inner suction port and a valve chamber intervening said at least one inner and outer suction ports and communicatively connected therewith, the valve chamber including a valve seat proximal the at least one inner suction port, a port in each body at a body part remote from its suction face for connecting the lifting head with a source of vacuum, said connecting port being in communication with said at least one inner suction port for establishing vacuum condition at said one inner suction port, a valve disk in said valve chamber, said valve disk having multiple through holes therein at a circumferential region thereof, said valve disk being sized such and the through holes such positioned therein as to lie outside a circumferential expanse of said at least one outer suction port, said valve disk being drawn against said valve seat by a differential of pressure represented by the vacuum condition at said at least one inner port present at one valve disk face, and a communication of said at least one outer suction port with ambient atmosphere present at an opposite valve disk face, said valve chamber having stepped structure therein proximal said at least one outer suction port, said valve disk moving to a position wherein its circumferential region is supported on said stepped structure with at least portions of the through holes unobstructed by such stepped structure whenever a workpiece is in contact with the suction face and covers said at least one outer suction port to exclude communication thereof with ambient atmosphere, the condition of vacuum present at said one valve disk face communicating to the opposite valve disk face by way of the disk hole unobstructed portions so that with the said at least one outer suction port covered, workpiece holding condition of vacuum is sustained at said one outer suction port, a carrier, each of said lifting heads being fixed to said carrier, and means for moving said carrier in three-dimensional movement paths during workpiece lifting and holding operations.

* * * * *